Feb. 15, 1927.
W. MORRIS ET AL
1,617,720
TRAFFIC GUIDE MARKER
Filed May 20, 1925      2 Sheets-Sheet 1
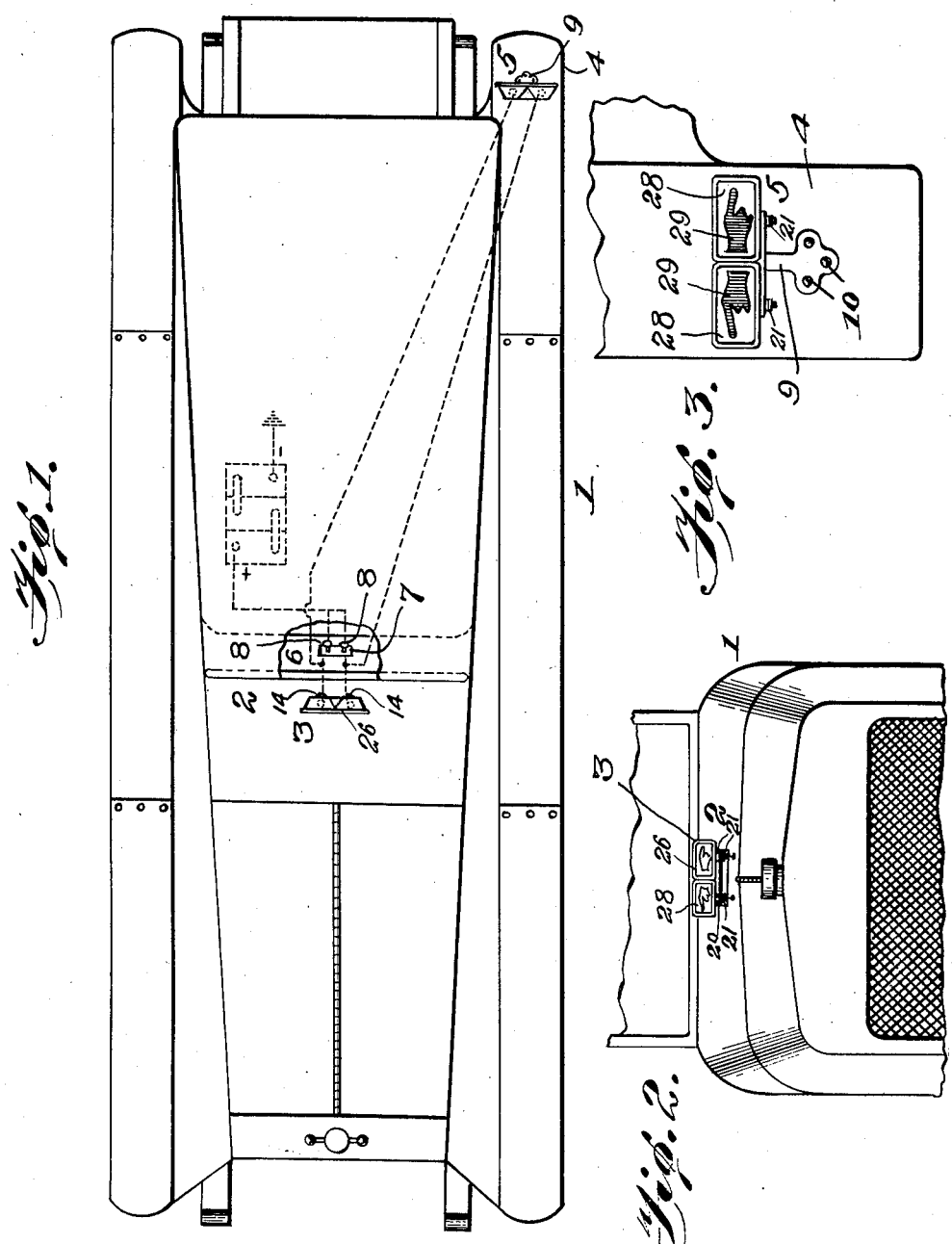
INVENTORS
W. Morris
C. Wyrostok.
BY
ATTORNEYS.

Feb. 15, 1927.
W. MORRIS ET AL
1,617,720
TRAFFIC GUIDE MARKER
Filed May 20, 1925  2 Sheets-Sheet 2
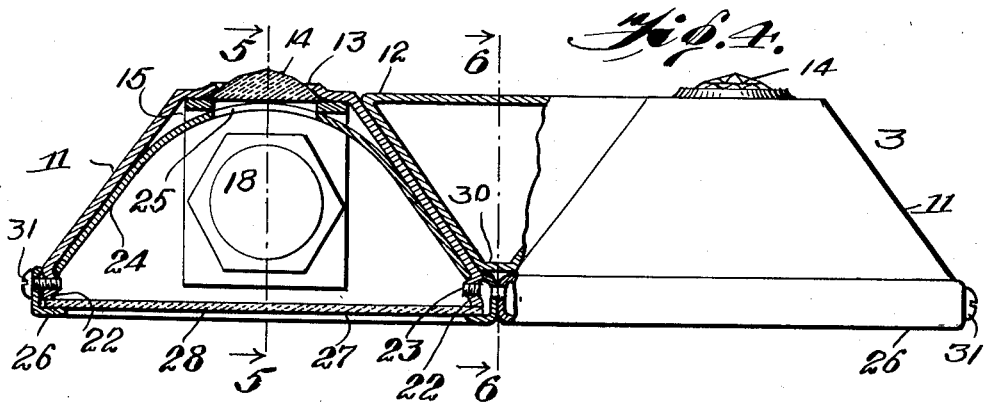
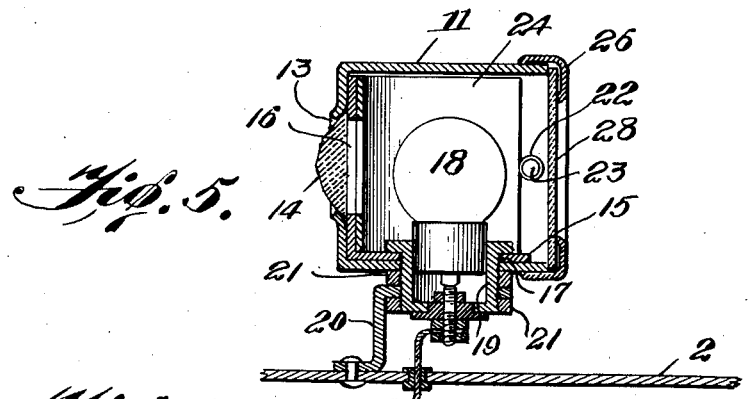
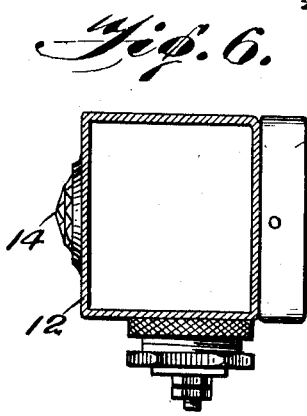
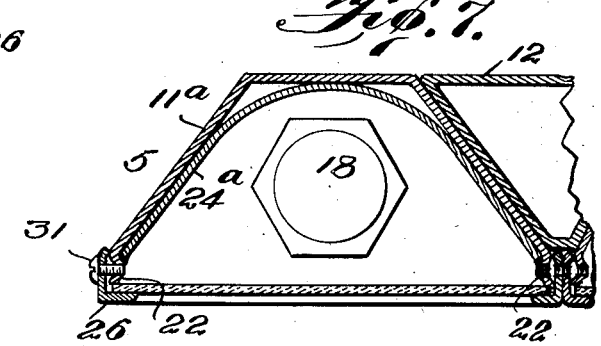
INVENTORS
W. Morris
C. Wyrostok
BY
ATTORNEYS.

Patented Feb. 15, 1927.

1,617,720

UNITED STATES PATENT OFFICE.

WILFRED MORRIS AND CHARLES WYROSTOK, OF TRENTON, NEW JERSEY.

TRAFFIC GUIDE MARKER.

Application filed May 20, 1925. Serial No. 31,546.

This invention relates to a traffic guide marker.

The object of this invention is the provision of simple and efficient means for indicating the direction the operator of a motor vehicle intends to take, in making a turn, whether to the right or to the left.

Another object of the invention is the improvement of the construction of a sectional casing in which are mounted the lamps, the indicating elements, and the reflectors.

With the foregoing and other objects in view, our invention comprises certain novel combinations, constructions and arrangements of parts as will be hereinafter fully described, illustrated in the accompanying drawings, and more particularly pointed out in the appended claim.

In the drawings:

Figure 1 is a diagram of a motor vehicle, showing our improved apparatus in position thereon.

Figure 2 is a front view of a motor vehicle, showing the position of one of our devices thereon.

Figure 3 is a fragmentary view of a mud guard of a motor vehicle, showing our device affixed thereto.

Figure 4 is a view partly in horizontal section and partly in full lines of one of the embodiments of our device.

Figure 5 is a sectional view taken on line 5—5, Figure 4, and looking in the direction of the arrows.

Figure 6 is a sectional view taken on line 6—6, Figure 4, and looking in the direction of the arrows.

Figure 7 is a fragmentary, horizontal, sectional view of another embodiment of our invention.

Figure 8 is a perspective view of one form of screws that may be used in our device.

Referring to the drawings by numerals, 1 designates the motor vehicle upon the front 2 of which is mounted our device 3, and upon one of the rear mud guards 4 is mounted our device 5. Upon the instrument board 6 is positioned switch 7, and this switch is preferably provided with the usual two-button devices 8, one of which button devices 8 being connected to, say, the right lamp in device 3 and the right lamp in device 5 (Fig. 1), whereas the other button device 8 is connected to the left lamp in device 3 and the left lamp in device 5, so that the operator can, by operating either button, readily indicate to the traffic in what direction he intends to go, whether to the right or to the left.

The front device 3 is, preferably, attached by any suitable means to portion 2, whereas the rear device 5 is mounted upon a metal bracket 9, which bracket 9 is fastened by rivets 10 to the mud guard 4, Figure 3.

The front device 3 is shown in detail in Figure 4, in which figure, 11—11 are the lamp carrying bodies, and these bodies are each substantially triangular shape, with a central or intermediate filler body 12 therebetween for bracing and strengthening the entire structure. This intermediate filler body 12 is triangular in shape and fits snugly in place. In the back of each of the lamp carrying bodies 11 is a reflector opening 13, into which is positioned the glass 14. An angle plate 15 is mounted in each section or body 11, and this plate is provided with two openings 16 and 17. The openings 16 register with the glass 14 to permit the rays from the lamp 18 to shine through the glass. The lamp 18 is held in a sleeve 19, which sleeve 19 screws through opening 17, as clearly shown in Figure 5. An angle bracket 20 is fastened, at its lower end, to the body of portion 2 of the motor vehicle, and the sleeve 19 extends through the upper part of bracket 20 with lock nuts 21 at opposite sides of the bracket 20 and screwed upon the threaded sleeve 19 (Fig. 5) whereby the device is held in position upon the motor vehicle; it is to be noted that we preferably use two brackets 20 to support a single device 3, because there are two lamp carrying sleeves 19 depending from the sections or bodies 11.

Any standard or common electrical connection is made with the lamp 18 (Fig. 5) whereby a current is supplied to the lamp upon the button device of switch 7 (Fig. 1) being operated.

Each section or body 11 is pressed in, at 22, near its outer edge and at opposite parts (Fig. 4), and in these inwardly extending socket-like portions 22 are formed threaded apertures 23 which are adapted to receive screws, as hereinafter described. These inwardly pressed portions 22 form excellent means to be engaged by the outer ends of the bowed springy reflector plates 24. Each reflector plate 24 is provided with an opening 25 registering with the opening 16 in angle plate 15 and the glass 14 to permit the rays from lamp 8 to shine through. These inwardly pressed portions 22 hold or retain the reflector plates 24 securely within the body without any other means being used for fastening said plates in position.

Two caps 26 are used, each having openings 27, so that the rays from the lamps 18 can shine through the glass plates 28, on which plates we preferably expose hands 29 (Fig. 3) indicating the direction the motor may take in turning. Each plate 28 rests against the outer edge of the body 11 (Figs. 4 and 5) and is held in place when the cap is in position upon the body. The caps 26 of each device are preferably soldered together at the inner abutting ends (Fig. 4), with their inner edges fitting snugly against the flat nose 30 of the triangular intermediate or filler section 12, whereby a very snug and substantial structure is produced when all the parts are assembled. The caps are held in place by means of screws 31 that pass through the outer ends of the caps and are threaded into the threaded apertures 23 formed in the inwardly pressed portions 22, as clearly shown in Figure 4.

In the embodiment shown in Figure 7, we have illustrated the rear device 5 (Fig. 3), which is similarly constructed to the embodiment shown in Figure 4 (also in Figure 1) except that as this device is to be used on the mud guard 4, the glasses 14 are eliminated, and, consequently, there is no rear opening 13 formed in the body 11ª, nor is there any opening in the reflector plate 24ª. The operator can quickly determine whether the apparatus is working, for upon operating the switch 7, he can see the light through the glass 14 of the front device 3, and upon seeing the light, he will know that the apparatus is in perfect running order. In Figures 7 and 8, we have illustrated how screws 32 with a slit end for a screw driver can be used in the registering apertures of the caps 26 and apertures 23. Further, this type of screw 32 makes a very neat appearance on a finished device, as it shows no head (as do screws 31) beyond the outer face of the cap, yet it is efficient in operation.

The central filler section 12, with its flat nose 13 can not be as deep as the bodies 11 or 11ª, because the caps have to fit in place upon the bodies, yet the abutting ends of the caps also abut snugly against the nose 30 as well as fill the space that is not filled by section 12 just at the edges and the inner ends of sections or bodies 11 and 11ª.

We have found from experience with the working model of our device that it is practical and efficient in operation, and by reason of its parts being so peculiarly and compactly assembled, a very durable apparatus is produced.

There is a marked advantage in forming the cap-structure of two distinct caps 26 and soldering the abutting inner ends together, and this advantage rests primarily in reducing the labor cost, for in making each cap, its opposite ends can be apertured for receiving the screws 31 or 32 and then in assembling, it makes no difference which of the ends are brought together and soldered, as all ends being apertured for the screws, either end will do to be left for receiving the screw, and the further advantage in this structure is that the abutting ends form filler means between the sections and nose 30, producing a compact structure and one that also holds the glass plates 28 securely in position and against rattling or great lateral or sidewise movement.

While we have described the preferred embodiments of our invention and have illustrated the same in the accompanying drawings, certain alterations and changes may appear to one skilled in the art to which this invention relates, during the extensive manufacture of the same, and we, therefore, reserve the right to make such alterations and changes as shall fairly fall within the scope of the appended claim.

What we claim is:

In an apparatus of the class described, the combination of a sectional casing structure, comprising lamp carrying bodies, each body provided at opposite sides only with inwardly pressed socket-like portions, said inwardly pressed socket-like portions provided with threaded apertures, a bowed reflector plate "sprung" into said body and having its ends engaging and positioned behind said inwardly pressed socket-like portions, caps on said body provided with apertures registering with said threaded apertures in the inwardly pressed socket-like portions, screws in some of said registering apertures, and lamps in said bodies in front of said reflector plates.

In testimony whereof we hereunto affix our signatures.

WILFRED MORRIS.
CHARLES WYROSTOK.